US00RE44220E

(19) United States
(12) Reissued Patent
Turner et al.

(10) Patent Number: US RE44,220 E
(45) Date of Reissued Patent: *May 14, 2013

(54) ELECTRONIC IDENTIFICATION SYSTEM AND METHOD WITH SOURCE AUTHENTICITY

(75) Inventors: Christopher Gordon Gervase Turner, Oakley (GB); Johan Dawid Kruger, Gauteng (ZA)

(73) Assignee: ZIH Corp., Hamilton (BM)

( * ) Notice: This patent is subject to a terminal disclaimer.

(21) Appl. No.: 12/479,504

(22) Filed: Jun. 5, 2009
(Under 37 CFR 1.47)

Related U.S. Patent Documents

Reissue of:
(64) Patent No.: 7,228,433
Issued: Jun. 5, 2007
Appl. No.: 11/247,959
Filed: Oct. 11, 2005

U.S. Applications:
(63) Continuation of application No. 10/827,814, filed on Apr. 20, 2004, now Pat. No. 6,954,533, which is a continuation of application No. 09/334,151, filed on Jun. 16, 1999, now Pat. No. 6,724,895.

(30) Foreign Application Priority Data

Jun. 18, 1998 (ZA) ..... 98/5286

(51) Int. Cl.
*H04L 29/06* (2006.01)

(52) U.S. Cl.
USPC ..... 713/182; 713/185; 713/193

(58) Field of Classification Search ..... 713/182, 713/185, 189, 193
See application file for complete search history.

(56) References Cited

U.S. PATENT DOCUMENTS 3,729,362 A 4/1973 French et al.
3,956,615 A * 5/1976 Anderson et al. ..... 705/72

(Continued)

FOREIGN PATENT DOCUMENTS

AU 743556 9/1998
DE 196 53 113 6/1997

(Continued)

OTHER PUBLICATIONS

Blahut, R. E., *Theory and Practice of Error control Codes*, Chapter 4, The Arithmetic of Galois Fields, Addison-Wesley Publishing Company, 1993, p. 65, 80, 81, 82, 83.

(Continued)

*Primary Examiner* — Benjamin Lanier
(74) *Attorney, Agent, or Firm* — Alston & Bird LLP

(57) ABSTRACT

An RF electronic identification system (10) is disclosed and claimed. The system includes at least one transponder encoder (14.1) for writing data into a memory arrangement (52) of a selected transponder (1.1) of a plurality of transponders (1.1 to 1.n) adapted to receive data from the at least one encoder. The system further includes at least one verifier (16) for interrogating a selected transponder (1.1) and to read data stored in the transponder. The encoder includes a controller (42) for providing an identification code characteristic of the encoder to form part of the data to be written into the transponder. The verifier includes computing means (56) for extracting the identification code from the data read thereby and for comparing the code to authorized codes. An indicator (18) provides an indication whether the identification code corresponds to any of the authorized codes or not. A method of verifying the authenticity of a transponder is also disclosed and claimed.

33 Claims, 3 Drawing Sheets

U.S. PATENT DOCUMENTS

| | | | | | |
|---|---|---|---|---|---|
| 4,111,121 | A | | 9/1978 | Borum | |
| 4,132,583 | A | | 1/1979 | Hodgson | |
| 4,496,237 | A | | 1/1985 | Schron | |
| 4,516,208 | A | | 5/1985 | Sakura et al. | |
| 4,663,622 | A | | 5/1987 | Goldman | |
| 4,691,202 | A | | 9/1987 | Denne et al. | |
| 4,783,798 | A | | 11/1988 | Leibholz et al. | |
| 4,807,287 | A | * | 2/1989 | Tucker et al. | 713/179 |
| 4,839,642 | A | | 6/1989 | Batz et al. | |
| 4,846,504 | A | | 7/1989 | Macgregor et al. | |
| 4,855,754 | A | | 8/1989 | Tanaka et al. | |
| 4,857,893 | A | | 8/1989 | Carroll | |
| 4,870,459 | A | | 9/1989 | Ito et al. | |
| 4,882,604 | A | | 11/1989 | Kato et al. | |
| 4,930,915 | A | | 6/1990 | Kikuchi et al. | |
| 4,961,142 | A | * | 10/1990 | Elliott et al. | 705/73 |
| 4,970,531 | A | | 11/1990 | Shimizu et al. | |
| 4,993,068 | A | * | 2/1991 | Piosenka et al. | 713/186 |
| 5,010,573 | A | * | 4/1991 | Musyck et al. | 380/28 |
| 5,015,834 | A | | 5/1991 | Suzuki et al. | |
| 5,024,718 | A | | 6/1991 | Hannen | |
| 5,036,461 | A | * | 7/1991 | Elliott et al. | 705/44 |
| 5,041,826 | A | | 8/1991 | Milheiser | |
| 5,066,978 | A | | 11/1991 | Watarai et al. | |
| 5,078,523 | A | | 1/1992 | McGourty et al. | |
| 5,132,729 | A | | 7/1992 | Matsushita et al. | |
| 5,148,534 | A | | 9/1992 | Comerford | |
| 5,167,752 | A | | 12/1992 | Dowling | |
| 5,189,246 | A | | 2/1993 | Marsh et al. | |
| 5,196,840 | A | * | 3/1993 | Leith et al. | 340/5.26 |
| 5,216,464 | A | | 6/1993 | Kotani et al. | |
| 5,229,587 | A | | 7/1993 | Kimura et al. | |
| 5,239,294 | A | * | 8/1993 | Flanders et al. | 340/5.74 |
| 5,266,968 | A | | 11/1993 | Stephenson | |
| 5,272,503 | A | | 12/1993 | LeSueur et al. | |
| 5,282,421 | A | | 2/1994 | Marsh et al. | |
| 5,283,597 | A | | 2/1994 | Yoshida et al. | |
| 5,283,613 | A | | 2/1994 | Midgley, Sr. | |
| D347,021 | S | | 5/1994 | Adams et al. | |
| 5,318,370 | A | | 6/1994 | Nehowig | |
| 5,333,960 | A | | 8/1994 | Nam | |
| 5,340,968 | A | | 8/1994 | Watanabe et al. | |
| 5,353,009 | A | | 10/1994 | Marsh et al. | |
| 5,355,413 | A | * | 10/1994 | Ohno | 713/159 |
| 5,379,344 | A | * | 1/1995 | Larsson et al. | 380/251 |
| 5,385,416 | A | | 1/1995 | Maekawa et al. | |
| 5,387,302 | A | | 2/1995 | Bernard et al. | |
| 5,400,319 | A | * | 3/1995 | Fite et al. | 369/275.5 |
| 5,406,890 | A | | 4/1995 | Marsh et al. | |
| 5,428,659 | A | | 6/1995 | Renner et al. | |
| 5,452,059 | A | | 9/1995 | Sekiya | |
| 5,455,617 | A | | 10/1995 | Stephenson et al. | |
| 5,479,467 | A | | 12/1995 | Katsumata | |
| 5,491,540 | A | | 2/1996 | Hirst | |
| 5,491,751 | A | * | 2/1996 | Paulson et al. | 705/51 |
| 5,507,489 | A | * | 4/1996 | Reibel et al. | 463/17 |
| 5,510,884 | A | | 4/1996 | Bov, Jr. et al. | |
| 5,513,169 | A | * | 4/1996 | Fite et al. | 720/718 |
| 5,519,381 | A | | 5/1996 | Marsh et al. | |
| 5,528,222 | A | | 6/1996 | Moskowitz et al. | |
| 5,537,105 | A | | 7/1996 | Marsh et al. | |
| 5,541,904 | A | * | 7/1996 | Fite et al. | 369/53.21 |
| 5,544,273 | A | | 8/1996 | Harrison | |
| 5,546,163 | A | | 8/1996 | Asai et al. | |
| 5,557,280 | A | | 9/1996 | Marsh et al. | |
| 5,566,441 | A | | 10/1996 | Marsh et al. | |
| 5,568,552 | A | | 10/1996 | Davis | |
| 5,572,193 | A | * | 11/1996 | Flanders et al. | 340/5.74 |
| 5,577,121 | A | * | 11/1996 | Davis et al. | 705/67 |
| 5,579,088 | A | | 11/1996 | Ko | |
| 5,614,278 | A | | 3/1997 | Chamberlain et al. | |
| 5,625,692 | A | | 4/1997 | Herzberg et al. | |
| 5,625,693 | A | | 4/1997 | Rohatgi et al. | |
| 5,640,002 | A | * | 6/1997 | Ruppert et al. | 235/462.46 |
| 5,660,663 | A | | 8/1997 | Chamberlain et al. | |
| 5,666,585 | A | | 9/1997 | Nagira et al. | |
| 5,699,066 | A | | 12/1997 | Marsh et al. | |
| 5,713,679 | A | | 2/1998 | Taylor | |
| 5,717,974 | A | | 2/1998 | Park | |
| 5,724,423 | A | * | 3/1998 | Khello | 713/184 |
| 5,724,425 | A | | 3/1998 | Chang et al. | |
| 5,726,630 | A | | 3/1998 | Marsh et al. | |
| 5,754,656 | A | | 5/1998 | Nishioka et al. | |
| 5,755,519 | A | | 5/1998 | Klinefelter | |
| 5,760,916 | A | * | 6/1998 | Dellert et al. | 358/408 |
| 5,771,291 | A | * | 6/1998 | Newton et al. | 713/185 |
| 5,781,635 | A | * | 7/1998 | Chan | 380/30 |
| 5,781,708 | A | | 7/1998 | Austin et al. | |
| 5,787,174 | A | * | 7/1998 | Tuttle | 713/189 |
| 5,787,278 | A | | 7/1998 | Barton et al. | |
| 5,797,060 | A | | 8/1998 | Thompson | |
| 5,805,703 | A | | 9/1998 | Crandall | |
| 5,810,353 | A | | 9/1998 | Baskette et al. | |
| 5,865,390 | A | | 2/1999 | Iveges | |
| 5,867,102 | A | | 2/1999 | Souder et al. | |
| 5,875,248 | A | * | 2/1999 | Lewis | 713/168 |
| 5,881,136 | A | * | 3/1999 | Tasker et al. | 379/100.09 |
| 5,892,211 | A | * | 4/1999 | Davis et al. | 235/380 |
| 5,897,741 | A | | 4/1999 | Mills et al. | |
| 5,902,437 | A | | 5/1999 | McDonough et al. | |
| 5,907,739 | A | | 5/1999 | Tsunemi et al. | |
| 5,907,748 | A | | 5/1999 | Kawana | |
| 5,909,233 | A | | 6/1999 | Hamman et al. | |
| 5,917,911 | A | * | 6/1999 | Dabbish et al. | 380/286 |
| 5,978,483 | A | * | 11/1999 | Thompson et al. | 380/262 |
| 5,982,295 | A | | 11/1999 | Goto et al. | |
| 5,995,626 | A | | 11/1999 | Nishioka et al. | |
| 6,011,937 | A | | 1/2000 | Chaussade et al. | |
| 6,014,533 | A | | 1/2000 | Kawana | |
| 6,015,344 | A | * | 1/2000 | Kelly et al. | 463/16 |
| 6,019,461 | A | | 2/2000 | Yoshimura et al. | |
| 6,019,865 | A | | 2/2000 | Palmer et al. | |
| 6,049,289 | A | | 4/2000 | Waggamon et al. | |
| 6,049,610 | A | | 4/2000 | Crandall | |
| 6,050,622 | A | | 4/2000 | Gustafson | |
| 6,068,372 | A | | 5/2000 | Rousseau et al. | |
| 6,075,997 | A | | 6/2000 | Lindqvist et al. | |
| 6,092,888 | A | | 7/2000 | Eade et al. | |
| 6,099,178 | A | | 8/2000 | Spurr et al. | |
| 6,100,804 | A | | 8/2000 | Brady et al. | |
| 6,106,166 | A | | 8/2000 | Spurr et al. | |
| 6,118,379 | A | | 9/2000 | Kodukula et al. | |
| 6,123,796 | A | | 9/2000 | Kathmann et al. | |
| 6,130,613 | A | | 10/2000 | Eberhardt et al. | |
| 6,163,260 | A | | 12/2000 | Conwell et al. | |
| 6,163,361 | A | | 12/2000 | McIntyre et al. | |
| 6,163,631 | A | | 12/2000 | Kawanishi et al. | |
| 6,173,119 | B1 | | 1/2001 | Manico et al. | |
| 6,188,423 | B1 | | 2/2001 | Pou | |
| 6,206,292 | B1 | | 3/2001 | Robertz et al. | |
| 6,227,643 | B1 | | 5/2001 | Purcell et al. | |
| 6,246,326 | B1 | | 6/2001 | Wiklof et al. | |
| 6,249,291 | B1 | * | 6/2001 | Popp et al. | 345/473 |
| 6,263,170 | B1 | | 7/2001 | Bortnem | |
| 6,271,928 | B1 | | 8/2001 | Bullock et al. | |
| 6,280,544 | B1 | | 8/2001 | Fox et al. | |
| 6,285,342 | B1 | | 9/2001 | Brady et al. | |
| 6,286,762 | B1 | | 9/2001 | Reynolds et al. | |
| 6,290,138 | B1 | | 9/2001 | Ohno et al. | |
| 6,295,423 | B1 | | 9/2001 | Haines et al. | |
| 6,312,106 | B1 | | 11/2001 | Walker | |
| 6,327,972 | B2 | | 12/2001 | Heredia et al. | |
| 6,332,062 | B1 | | 12/2001 | Phillips et al. | |
| 6,334,921 | B1 | | 1/2002 | Duschek | |
| 6,351,618 | B1 | | 2/2002 | Pollocks, Jr. | |
| 6,351,621 | B1 | | 2/2002 | Richards et al. | |
| 6,357,503 | B1 | | 3/2002 | Kromer et al. | |
| 6,363,483 | B1 | | 3/2002 | Keshav | |
| 6,375,298 | B2 | | 4/2002 | Purcell et al. | |
| 6,381,418 | B1 | | 4/2002 | Spurr et al. | |
| 6,385,407 | B1 | | 5/2002 | Inose | |
| 6,386,772 | B1 | | 5/2002 | Klinefelter et al. | |
| 6,404,335 | B1 | | 6/2002 | Ohno et al. | |
| 6,409,401 | B1 | | 6/2002 | Petteruti et al. | |
| 6,418,283 | B1 | | 7/2002 | Wegman et al. | |
| 6,451,154 | B1 | | 9/2002 | Grabau et al. | |
| 6,473,571 | B1 | | 10/2002 | Wegman et al. | |

| | | | |
|---|---|---|---|
| 6,487,812 | B2 | 12/2002 | Johnson |
| 6,490,352 | B1 | 12/2002 | Schroeppel |
| 6,490,420 | B2 | 12/2002 | Pollocks, Jr. |
| 6,522,348 | B1 | 2/2003 | Brot et al. |
| 6,525,835 | B1 | 2/2003 | Gulati |
| 6,527,356 | B1 | 3/2003 | Spurr et al. |
| 6,532,351 | B2 | 3/2003 | Richards et al. |
| 6,536,660 | B2 | 3/2003 | Blankenship et al. |
| 6,539,867 | B2 | 4/2003 | Lee |
| 6,546,327 | B2 | 4/2003 | Hattori et al. |
| 6,557,606 | B1 | 5/2003 | Duschek |
| 6,557,758 | B1 | 5/2003 | Monico |
| 6,588,658 | B1 | 7/2003 | Blank |
| 6,592,035 | B2 | 7/2003 | Mandile |
| 6,593,853 | B1 | 7/2003 | Barrett et al. |
| 6,593,952 | B1 | 7/2003 | Funayama et al. |
| 6,597,465 | B1 | 7/2003 | Jarchow et al. |
| 6,603,497 | B2 | 8/2003 | Hevenor et al. |
| 6,629,134 | B2 | 9/2003 | Hayward et al. |
| 6,634,814 | B2 | 10/2003 | Spurr et al. |
| 6,636,702 | B2 | 10/2003 | Abe |
| 6,644,544 | B1 | 11/2003 | Spurr et al. |
| 6,644,771 | B1 | 11/2003 | Silverbrook |
| 6,683,638 | B2 | 1/2004 | Sato |
| 6,687,634 | B2 | 2/2004 | Borg |
| 6,694,884 | B2 | 2/2004 | Klinefelter et al. |
| 6,708,005 | B2 | 3/2004 | Chihara |
| 6,714,745 | B2 | 3/2004 | Sasame et al. |
| 6,722,753 | B2 | 4/2004 | Helterline et al. |
| 6,724,895 | B1 | 4/2004 | Turner et al. |
| 6,735,399 | B2 | 5/2004 | Tabb et al. |
| 6,738,903 | B1 | 5/2004 | Haines |
| 6,748,182 | B2 | 6/2004 | Yoshida et al. |
| 6,791,704 | B1 | 9/2004 | Moreau et al. |
| 6,793,307 | B2 | 9/2004 | Spun et al. |
| 6,798,997 | B1 | 9/2004 | Hayward et al. |
| 6,802,659 | B2 | 10/2004 | Cremon et al. |
| 6,807,380 | B2 | 10/2004 | Iida et al. |
| 6,808,255 | B1 | 10/2004 | Haines et al. |
| 6,820,039 | B2 | 11/2004 | Johnson et al. |
| 6,832,866 | B2 | 12/2004 | Klinefelter et al. |
| 6,879,785 | B2 | 4/2005 | Ito et al. |
| 6,894,711 | B2 | 5/2005 | Yamakawa et al. |
| 6,932,527 | B2 | 8/2005 | Pribula et al. |
| 6,954,533 | B2 | 10/2005 | Turner et al. |
| 6,963,351 | B2 | 11/2005 | Squires |
| 6,986,057 | B1 | 1/2006 | Cusey et al. |
| 7,018,117 | B2 | 3/2006 | Meier et al. |
| 7,031,946 | B1 | 4/2006 | Tamai et al. |
| 7,137,000 | B2 | 11/2006 | Hohberger et al. |
| 7,147,165 | B2 | 12/2006 | Mongin et al. |
| 7,183,505 | B2 | 2/2007 | Mongin et al. |
| 7,206,010 | B2 | 4/2007 | Maghakian |
| 7,228,433 | B2 | 6/2007 | Turner et al. |
| 7,237,485 | B2 | 7/2007 | Meier et al. |
| 7,430,762 | B2 | 9/2008 | Klinefelter et al. |
| 7,664,257 | B2 | 2/2010 | Hohberger et al. |
| 2001/0027443 | A1 | 10/2001 | Hanzawa et al. |
| 2001/0029857 | A1 | 10/2001 | Heredia et al. |
| 2001/0048361 | A1 | 12/2001 | Mays et al. |
| 2001/0056409 | A1 | 12/2001 | Bellovin et al. |
| 2002/0062898 | A1 | 5/2002 | Austin |
| 2002/0145036 | A1 | 10/2002 | Otto |
| 2002/0170973 | A1 | 11/2002 | Teraura |
| 2002/0195194 | A1 | 12/2002 | Grabau et al. |
| 2002/0195195 | A1 | 12/2002 | Grabau et al. |
| 2003/0063002 | A1 | 4/2003 | Okamoto et al. |
| 2003/0089444 | A1 | 5/2003 | Melzer et al. |
| 2003/0128269 | A1 | 7/2003 | Squires et al. |
| 2003/0183329 | A1 | 10/2003 | Duschek |
| 2003/0189490 | A1 | 10/2003 | Hogerton et al. |
| 2004/0109715 | A1 | 6/2004 | Meier et al. |
| 2004/0114981 | A1 | 6/2004 | Meier et al. |
| 2005/0275708 | A1 | 12/2005 | Squires et al. |
| 2006/0123471 | A1 | 6/2006 | Fontanella et al. |
| 2006/0203075 | A1 | 9/2006 | Vazac et al. |
| 2007/0056027 | A1 | 3/2007 | Nehowig et al. |
| 2007/0057057 | A1 | 3/2007 | Andresky et al. |
| 2008/0316523 | A1 | 12/2008 | Klinefelter et al. |

FOREIGN PATENT DOCUMENTS

| | | | |
|---|---|---|---|
| DE | 196 53 113 | A1 | 6/1997 |
| EP | 0 595 549 | A3 | 5/1994 |
| EP | 0 878 403 | A1 | 11/1998 |
| EP | 1 016 037 | B1 | 5/2000 |
| GB | 2 303 613 | A | 2/1997 |
| JP | 62(1987)-46281 | A | 2/1987 |
| JP | 03-220572 | A | 9/1991 |
| JP | 4(1992)-371026 | A | 12/1992 |
| JP | 5(1993)-335969 | A | 12/1993 |
| JP | 6-124369 | A | 5/1994 |
| JP | 9-104189 | A | 4/1997 |
| JP | 409-185324 | A | 7/1997 |
| JP | 11-263025 | A | 9/1999 |
| JP | 2000-062273 | A | 2/2000 |
| JP | 2000-246921 | A | 9/2000 |
| JP | 2000-355146 | A | 12/2000 |
| JP | 2001-001424 | A | 1/2001 |
| JP | 2001-096814 | A | 4/2001 |
| JP | 2001-215779 | A | 8/2001 |
| JP | 2001-510912 | A | 8/2001 |
| JP | 2002-334313 | A | 11/2002 |
| JP | 2003/011931 | A | 1/2003 |
| JP | 2003/011939 | A | 1/2003 |
| JP | 2003/159838 | A | 6/2003 |
| JP | 2003/207984 | A | 7/2003 |
| RU | 2 120 387 | C1 | 10/1998 |
| RU | 2 147 790 | C1 | 4/2000 |
| SE | 9604402-9 | | 5/1998 |
| SU | 1 069 276 | A1 | 11/1997 |
| WO | WO 96/08092 | A1 | 3/1996 |
| WO | WO 96/28941 | A1 | 9/1996 |
| WO | WO 97/11530 | A1 | 3/1997 |
| WO | WO 98/39734 | A1 | 9/1998 |
| WO | WO 98/52762 | A | 11/1998 |
| WO | WO 00/07807 | A1 | 2/2000 |
| WO | WO 00/43932 | A2 | 7/2000 |
| WO | WO 00/47410 | A1 | 8/2000 |
| WO | WO 01/00492 | A1 | 1/2001 |
| WO | WO 01/15382 | A1 | 3/2001 |
| WO | WO 01/57807 | A1 | 8/2001 |
| WO | WO 01/61646 | A1 | 8/2001 |
| WO | WO 02/35463 | A2 | 5/2002 |
| WO | WO 03/019459 | A2 | 3/2003 |
| WO | WO 03/029005 | A2 | 4/2003 |

OTHER PUBLICATIONS

Chang, C.C., et al., *Using Smart Cards to Authenticate Passwords*, Security Technology, 1993, Security Technology, Proceedings, Institute of Electrical and Electronics Engineers 1993 International Carnahan Conference on Oct. 13-15, 1993, pp. 154-156.

Da, L. et al., *The Encryptive Mechanism and Applications of Smart Card*; Computer Engineering; Published May 1997; 6 pages; vol. 23, No. 3.

Fenghua, J. et al., *A Practical Encryption Method Based on IC Card*; Published 1997; vol. 6.

Gupta, R. et al.; *On Randomization in Sequential and Distributed Algoritym*, ACM Computing Surveys (CSUR), vol. 26, Issue 1 (Mar. 1994), pp. 7-86.

Hohberger, C. P., A "White Paper" on the Development of AIM Industry Standards for 13.56 MHz RFID Smart Labels and RFID Printer/Encoders, dated May 24, 2000.

Liping, H., *Universal Read/Write System and Application of IC Card*; Journal of Tianjin University of Commerce; Published Mar. 1998; 6 pages; vol. 2.

Menezes, A. et al., *Handbook of Applied Cryptography*, CRC Press, 1997, pp. 389, 394, 395, 399, 401.

Stallings, W., *Key Management; Other Public-Key Cryptosystems, Cryptography and Network Security Principles and Practice*, Third Edition, Upper Saddle River, NJ, Prentice Hall, 2003, pp. 293-296.

Tu, K., *An ID-Based Cryptographic Technique for IFF*, Military Communications Conference, 1995 Milcom '95, Conference Records, IEEE, vol. 3, Nov. 8, 1995, pp. 1258-1262, vol. 3.

Xuebin, T. et al., *The Development of a Contract-less IC Card Used as ID Card*; Micoelectronics; Published Jun. 1998; 6 pages; vol. 28, No. 3.
3 pages from http://www.fargo.com/Products/ribbons.asp dated Jan. 17, 2001 regarding Fargo Electronics: card printer ribbons.
4 pages from Eltron® Card Printer Products re P200 Series Card Printers.
Motorola announces BiStatix 125KHz RFID tag, Transponder News Press Release, Mar. 2, 1999.
RFID Technology & Smart Labels, dated Sep. 14, 1999.
Bielomatik—One (1) page from http://www.bielomatik.de/sixcms/detail.php?id=906&template=schema_detail_en Apr. 1, 2003 re Mutli-Web Lamination process flow: Smart Tickets (Compact Version).
Bielomatik—Two (2) pages from http://www.bielomatik.de/sixcms/detail.php?id=876&template=masch_detail_en Apr. 1, 2003 re TLA-100 Transponder and Label Attaching Machine.
Bielomatik—One (1) page from http://www.bielomatik.de/sixcms/detail.php?id=903&template=masch_detail_en Apr. 1, 2003 re Multi-Web Lamination process flow: Smart Labels (Compact Version).
Biolomatik—Two (2) pages from http://www.bielomatik.de/sixcms/detail.php?id=877&template=masch$_{13}$ detail_en Apr. 1, 2003 re TTL-100 Transponder and Ticket Laminating Machine.
Bielomatik—Two (2) pages from http://www.bielomatik.de/sixcms/detail.php?id=874&template=masch_detail_en Apr. 1, 2003 re TAL-100 Transponder Attaching and Laminating Machine.
Bielomatik—One (1) page from http://www.bielomatik.de/sixcms/detail.php?id=908&template+schema_detail_en Apr. 1, 2003 re Multi-Web Lamination process flow: Smart Labels, Tags und (sic) Tickets.
International Search Report for Application No. PCT/US02/26617 dated Mar. 20, 2003.
The Supplementary European Search Report for European Patent Application No. 02 75 9421, completed Oct. 30, 2008.
U.S. Appl. No. 60/117,123, filed Jan. 25, 1999 entitled Ribbon Core Identification Coding Device.
U.S. Appl. No. 60/459,712, filed Apr. 2, 2003 entitled *Inverted Identification Card Printing and Ribbon Cartridge*.
U.S. Appl. No. 60/497,009, filed Aug. 19, 2003 entitled *Identification Card Printer and Ribbon Cartridge*.
U.S. Appl. No. 60/314,926, filed Aug. 24, 2011 entitled *Method and Apparatus for Consumable Authentication*.
U.S. Appl. No. 12/648,961, filed Dec. 29, 2009, In re: Holberger et al., entitled *Method and Apparatus for Article Authentication*.
Office Action for U.S. Appl. No. 12/648,961 dated Jun. 29, 2011.
Office Action Response for U.S. Appl. No. 12/648,961 dated Nov. 29, 2011.
Office Action for U.S. Appl. No. 10/164,070 dated Jul. 2, 2004.
Office Action Response for U.S. Appl. No. 10/164,070 dated Jul. 19, 2004.
Office Action for U.S. Appl. No. 10/164,070 dated Jul. 29, 2005.
Office Action Response for U.S. Appl. No. 10/164,070 dated Nov. 14, 2005.
Supplemental Office Action Response for U.S. Appl. No. 10/164,070 dated Jan. 18, 2006.
Office Action for U.S. Appl. No. 11/364,354 dated Sep. 26, 2007.
Office Action Response for U.S. Appl. No. 11/364,354 dated Jan. 25, 2008.
Final Office Action for U.S. Appl. No. 11/364,354 dated Mar. 5, 2008.
Office Action for U.S. Appl. No. 11/364,354 dated Sep. 18, 2008.
Office Action Response for U.S. Appl. No. 11/364,354 dated Dec. 17, 2008.
Office Action for U.S. Appl. No. 11/364,354 dated Feb. 25, 2009.
Office Action Response for U.S. Appl. No. 11/364,354 dated Jul. 27, 2009.
Supplemental Office Action Response for U.S. Application No. 11/364,354 dated Aug. 19, 2009.

* cited by examiner

ELECTRONIC IDENTIFICATION SYSTEM AND METHOD WITH SOURCE AUTHENTICITY

Matter enclosed in heavy brackets [ ] appears in the original patent but forms no part of this reissue specification; matter printed in italics indicates the additions made by reissue.

This application is a continuation of application Ser. No. 10/827,814, filed Apr. 20, 2004 now U.S. Pat. No. 6,954,533, which is a continuation of application Ser. No. 09/334,151, filed Jun. 16, 1999 now U.S. Pat. No. 6,724,895, which application is incorporated herein by reference.

INTRODUCTION AND BACKGROUND

THIS invention relates to electronic identification systems and more particularly to such systems including radio frequency (RF) transponders and associated readers, interrogators and verifiers therefor.

A system of the aforementioned kind is typically used to mark and identify products or goods, and would further include a plurality of encoder units for writing data into respective memory arrangements of the transponders. In use, a transponder is attached to a product item and the data written into the transponder may relate to the kind of product, the date of manufacture and/or any other data relating to the product. Normally the data is written into the memory arrangement at the source of the product, but in some applications additional data may be written into the memory arrangement at various points along a distribution chain. Of course the data written into the memory arrangement can at any stage be read with a verifier, interrogator or reader.

In some applications, security arrangements are required which would prevent unauthorized parties from attaching non-genuine transponders (purporting to store data encoded by an authorised encoder) to grey or infringing goods, thereby facilitating passing the grey goods off as genuine goods.

OBJECT OF THE INVENTION

Accordingly, it is an object of the present invention to provide a system and method with which the applicant believes transponders originating from an authorized source could be distinguished from non-genuine transponders.

SUMMARY OF THE INVENTION

According to the invention there is provided an electronic identification system, the system including:

- at least one transponder encoder for writing data into a memory arrangement of a transponder;
- a plurality of transponders adapted to receive data from the at least one encoder;
- at least one verifier for interrogating a selected transponder and to read data stored in the transponder;
- said encoder including means for providing an identification code characteristic of an entity externally of the transponder, to form part of the data to be written into the transponder;
- the verifier including computing means for extracting the identification code from the data read thereby and for comparing the code to an authorized code; and indicator means for giving an indication whether the identification code corresponds to the authorized code.

The identity code is preferably characteristic of the encoder.

The encoder may include a memory arrangement wherein a plurality of identification codes for the encoder are stored and the means for providing an identification code may include a controller for randomly selecting one of the authorized codes.

The system may further include a central computer for generating the plurality of identification codes and for downloading the identification codes into the at least one encoder and into the at least one verifier, to constitute corresponding authorized codes.

The controller of the encoder may further include encryption means utilizing a first encryption algorithm and the identification code in a first encryption process, to provide encrypted data relating to the identification code, to form part of the data to be written into the transponder.

In a preferred embodiment the controller of the encoder is programmed randomly to select the first encryption algorithm from a first set of encryption algorithms pre-stored in the memory arrangement of the encoder.

Each encryption algorithm may be associated with a unique algorithm address in the memory arrangement of the encoder.

The algorithms may be downloaded from the central computer into the encoder upon start-up of the encoder. The algorithms are preferably also downloaded into memory locations of the verifier having corresponding addresses.

Each algorithm may include a function of at least one physical characteristic of the transponder, for example a clock frequency of circuitry of the transponder. The algorithm may be of a general form wherein the selected identification code is equal to at least one function of a suitable physical characteristic of the transponder plus a first remainder.

The data relating to the identification code and which forms part of the data to be written into the transponder may include the aforementioned first remainder. Preferably it consists of the first remainder only.

Data relating to the algorithm address of the selected algorithm may also be included in the data to be written into the memory arrangement of the transponder. The controller of the encoder may utilize a second algorithm and the data relating to the address in a second encryption process, to yield encrypted data relating to the algorithm address. The second algorithm may be of a general form wherein the algorithm address is equal to at least one function of an independent variable plus a second remainder.

The encrypted data relating to the algorithm address and which forms part of the data to be written into the transponder may include the aforementioned second remainder. Preferably it consists of the second remainder only.

The verifier may include computing means adapted to use the second algorithm to decrypt the encrypted data relating to the address for the first algorithm.

The computing means may further be programmed to retrieve the first algorithm, to input data relating to the physical characteristics of the transponder and to use said data and the first algorithm to decrypt the data relating to the identification code, to yield an output code.

The computing means of the verifier may further include a comparator for comparing the output code to the authorized codes which are stored in the memory arrangement of the verifier.

The indicating means of the verifier may include a display.

The verifier may form part of a reader for the transponders. Alternatively, it may be a separate unit.

Also included within the scope of the present invention is a method of verifying the authenticity of a transponder, the method including the steps of:

writing data into the transponder by an authorized transponder encoder;

including in the data, data relating to an identification code of an entity externally of the transponder;

reading the data written into the transponder with a verifier;

extracting from the data read, the data relating to the identification code;

comparing the extracted data to data relating to an authorised identification code for the entity; and providing an indication whether the extracted data matches the data relating to authorized identification code.

The identification code may be characteristic of the encoder.

The encoder may have a plurality of identification codes associated therewith and the method may include the step of randomly selecting one of these codes for inclusion in the data to be written into the transponder.

Further according to the method of the invention a first encryption algorithm and the selected identification code may be used in a first encryption process to yield encrypted data relating to the identification code. Preferably the first algorithm is selectable from a first set of encryption algorithms. The algorithms may include a function of at least one physical characteristic of the transponder into which the data is to be written.

Each of the first set of encryption algorithms may be accessible by the encoder from a memory arrangement thereof utilizing a respective algorithm address. The method may include the further step of including data relating to the algorithm address of the selected algorithm in the data to be written into the transponder. A second algorithm and data relating to the address of the selected algorithm may•be' utilized in a second encryption process to yield encrypted data relating to the algorithm address for inclusion in the data to be written into the transponder.

The method may further include the step of utilizing at the verifier the data relating to the algorithm address to retrieve from a memory arrangement of the verifier the algorithm utilized during the first encryption process.

The method may further include the steps of: providing computing means in the verifier with data relating to the physical characteristics of the transponder; and utilizing said data and the retrieved algorithm to decrypt the encrypted data relating to the identification code.

The method may still further include the step of comparing the decrypted data relating to the identification code to the data relating to authorized identification codes stored in a memory arrangement of the verifier.

Also included within the scope of the invention is a method of programming data into a transponder, the method including the steps of:

electronically measuring a physical characteristic of the transponder and producing data relating thereto;

utilizing the produced data in an encryption algorithm to encrypt data to be written into the transponder; and writing the encrypted data into a memory arrangement of the transponder.

The physical characteristic may be the frequency of a clock of the transponder and may be measured by receiving a response signal from the transponder and utilizing the received signal to measure the clock frequency. The encrypted data may be written into the transponder by transmitting it to the transponder.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
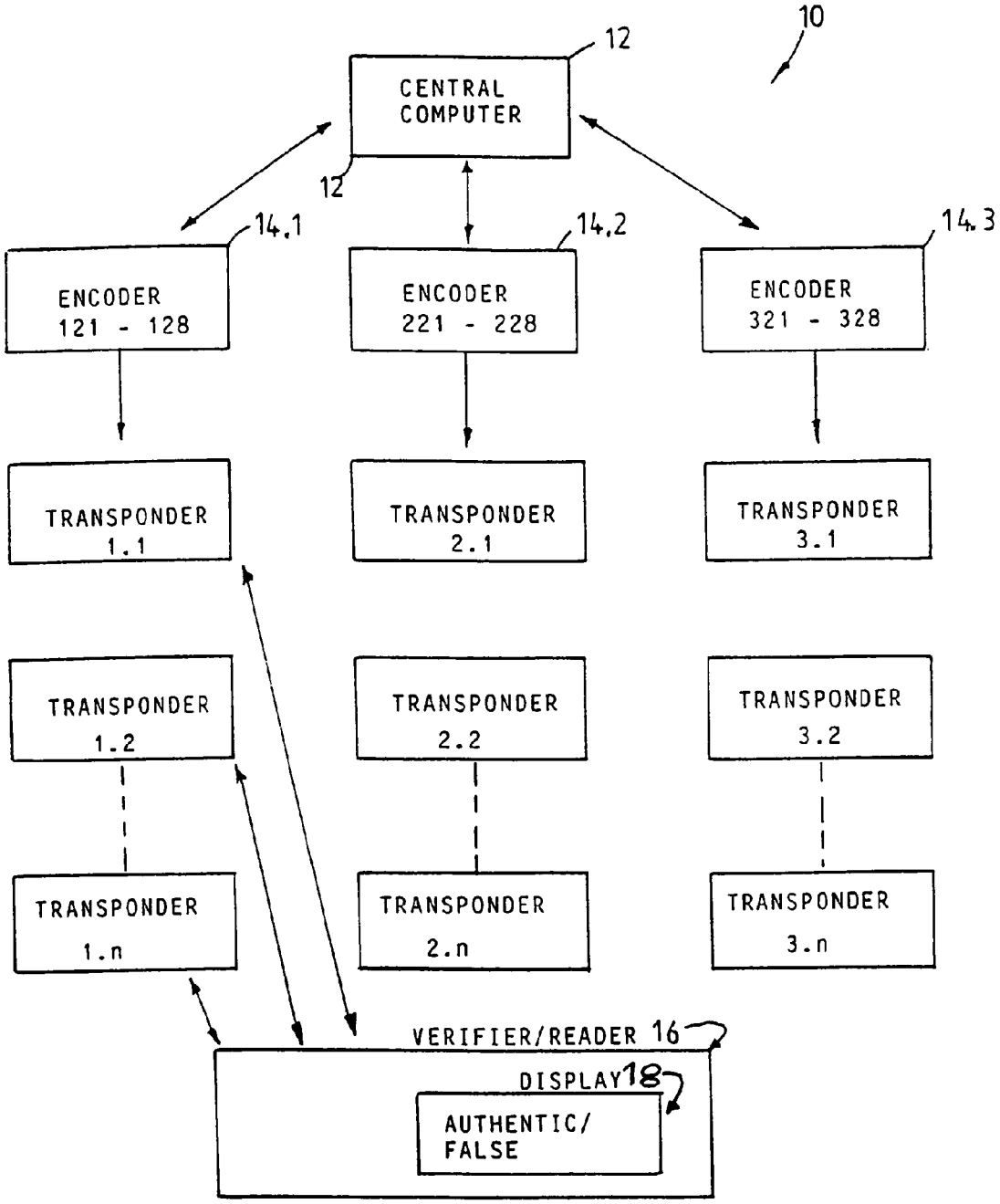
FIG. 1 is a basic block diagram of a system according to the invention.

An electronic identification system according to the invention is generally designated by the reference numeral 10 in FIG. 1.

The system 10 includes a central computer system 12 which manages and controls the rest of the system. The system 10 further includes a plurality of transponder encoders 14.1 to 14.3 adapted to be brought into communication with the central computer to be programmed thereby. In use, each encoder is preferably located at a source (not shown) or manufacturing plant of products to which transponders are to be secured, to program such transponders by writing data into the transponders. Each encoder has at least one, preferably eight plain-text identification (PTID) numbers or codes characteristic thereof. For example, the PTID'S associated with encoder 14.1 are numbers 121 to 128. These numbers are generated and issued by the central computer and stored in memory arrangements of each of the central computer 12, the relevant encoder and verifiers, which will be referred to hereinafter. Also stored in the central computer for downloading into the encoders and the verifiers respectively, are algorithms for encrypting data to be written into the transponders by the encoders and for decrypting the data by verifiers or readers, as will hereinafter be described. The PTID's and algorithms may from time to time be changed by the central computer 12 by downloading new numbers and algorithms, to maintain and improve the integrity and security of the system.

The system further includes a plurality of radio frequency (RF) transponders. Transponders 1.1 to 1.n are associated with encoder 14.1, transponders 2.1 to 2.n with encoder 14.2 and transponders 3.1 to 3.n with encoder 14.3.

The system still further includes a plurality of verifiers or readers (only one of which is shown at 16 in FIG. 1). The verifier includes display means 18 for displaying the outcome of an authenticity verification procedure performed in use by the verifier 16 on any of the transponders, in respect of the authenticity of an encoder used to program that transponder.

Figure 2:
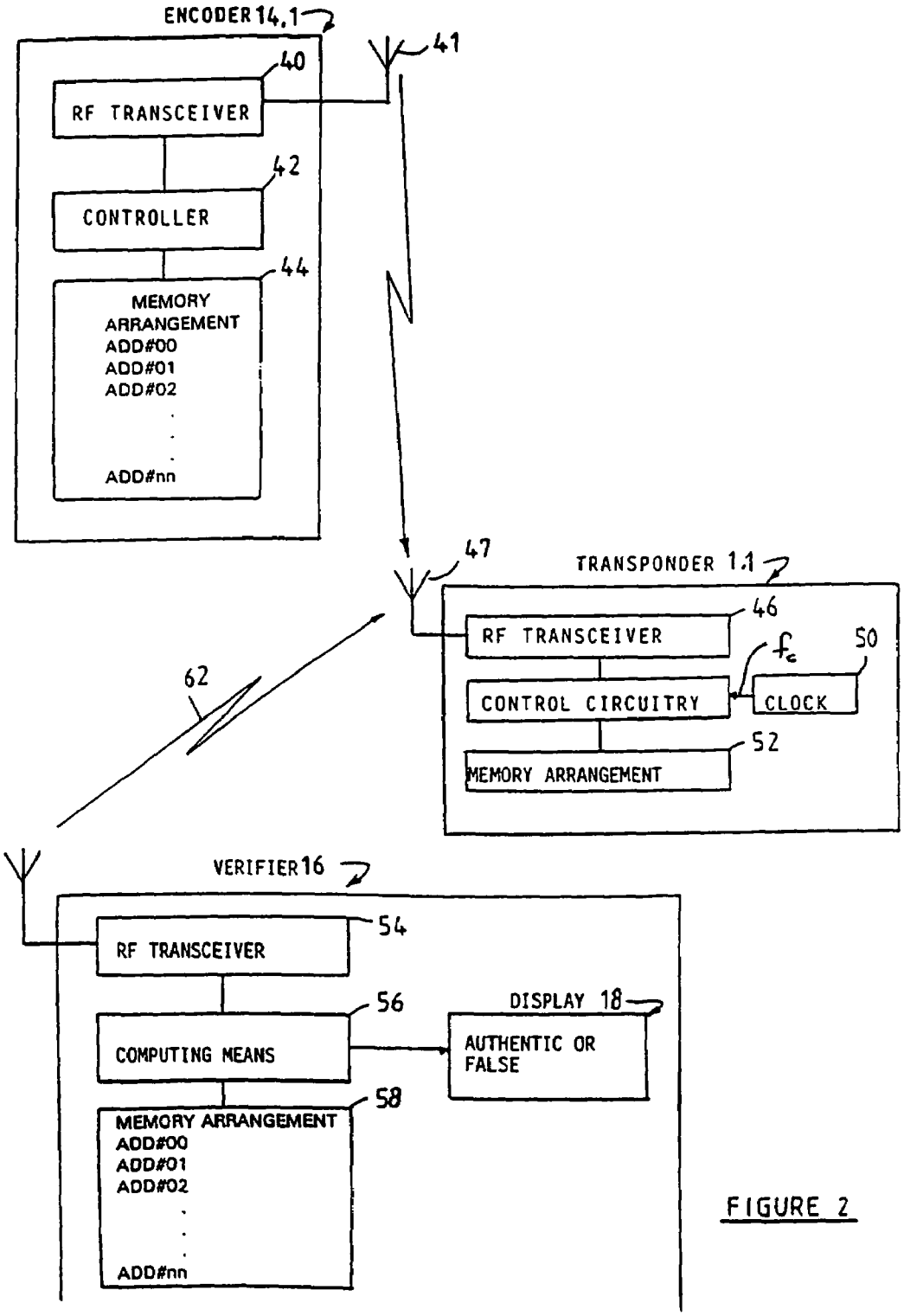
FIG. 2 is a block diagram showing an encoder, a transponder and a verifier forming part of the system in more detail.

The encoders 14.1 to 14.3 are similar and therefore only encoder 14.1 will be described in more detail herebelow with reference to FIG. 2. Encoder 14.1 includes an RF transceiver 40, a controller 42 and a memory arrangement 44. Memory arrangement 44 includes a plurality of storage locations each addressable by the controller by a unique address ADD#OO to ADD#nn. The aforementioned PTID codes of the encoder 14.1, once downloaded by the central computer 12, are stored in respective ones of these locations. The aforementioned encryption algorithms or data relating thereto are also stored in respective ones of these locations and are directly or indirectly retrievable by the controller 42 by the respective addresses.

The transponders are also similar and therefore only transponder 1.1 will be described in more detail. Transponder 1.1 includes an RF transceiver 46, control circuitry 48, a clock 50 having a clock frequency fc and a memory arrangement 52.

Verifier 16 may form part of a reader (not shown) for the transponders, or may be a separate unit. The verifier 16 includes an RF transceiver 54, computing means 56, display 18 and a memory arrangement 58. The memory arrangement 58 includes a plurality of storage locations each addressable by the computing means 56 by a unique address ADD#OO to ADD#nn. The aforementioned PTID codes of the encoders are received from the central computer and stored in respective ones of these locations. The aforementioned encryption/decryption algorithms are similarly received from the central computer and stored in respective locations, or data relating to the algorithms may be stored in these locations. The algorithms are directly or indirectly retrievable by the computing means 56 by their respective addresses.

In use and as is well known in the art, a selected transponder 1.1 is brought into range of a programmed encoder 14.1. Data including data relating to the product to which the transponder is to be applied is transmitted via an RF link including transceiver 40, antenna 41, antenna 47 and transceiver 46 to the transponder. The transponder receives that data and stores the data in memory arrangement 52 forming part of the transponder. Along the distribution chain of the product, further data may similarly be written into the memory arrangement 52.

As is also well known in the art, the data may at any stage be read by a reader or verifier 16 in known manner. The verifier 16 transmits an RF energizing signal 62 to the transponder 1.1 and a virtual battery forming part of the transponder circuitry 54 is charged. The transponder responds by backscatter modulating on the energizing signal serving as carrier, a data stream including the data stored in the memory arrangement 52 and timed by the frequency $f_c$ of the clock 50. The verifier 16 in turn receives this data and may be adapted in known manner to switch the transponder just read to a sleep or the like mode, which causes the transponder to stop modulating the energizing signal.

It will be appreciated that with such a conventional system an unauthorized distributor of pirate, grey or otherwise infringing goods may simply attach a non-genuine transponder (carrying data similar to the data carried by transponders attached to genuine goods) to the grey goods. Unless sophisticated security mechanisms and methods are employed, such grey goods will not easily be identified or traced.

According to the invention, encrypted data relating to a selected one of the PTID numbers of the source encoder 14.1 is written into and stored as part of the data stored in the memory arrangement 52 of the transponder. To achieve this, the encoder controller is adapted randomly to select anyone of the eight PTID numbers. This PTID number and a selected one of the encryption algorithms are utilized by encryption means forming part of the controller in a first encryption process, to yield encrypted data relating to the PTID number. At least some of the variables to be used with the encryption algorithm are functions of measurable physical characteristics of the transponder 1.1, such as the frequency fc of the transponder clock 50. The clock frequency fc is determined from a response signal from the transponder during the programming process.

The verifier 16 in turn is adapted (as will hereinafter be described) to retrieve the relevant decryption algorithm from its memory arrangement 58, to determine the relevant physical properties of the transponder concerned and to decipher the encrypted data into a plain-text number. If the deciphered plain-text number is equal to an authorized PTID number stored in the memory arrangement 58 of the verifier 16, an "AUTHENTIC" message is displayed on display 18. If the result of the deciphering process does not correspond to an authorized PTID, a "FALSE" message is displayed.

The encryption algorithm may be of the general form:

$$PTID=a.f(x)+b.f(y)+c.f(z)+rem \quad \text{—A}$$

wherein

PTID is the selected PTID number of the encoder;

a, b and c are scaling constants;

x, y z are independent variables, preferably relating to physical characteristics of the transponder being programmed; and rem is a remainder.

The encrypted data relating to the PTID of the encoder 14.1 and which is subsequently stored in the transponder 1.1, is preferably the remainder (rem) part only, of the above encryption process. The rem-data may be four bits in length.

As stated hereinbefore, a randomly selected first algorithm of a first set of encryption algorithms stored in the encoder 14.1 and correspondingly stored in the verifier 16 may be used to encrypt the PTID number of the encoder which is, as stated hereinbefore, randomly selected by the encoder from the available PTID numbers therefor. Data relating to the address where the selected first algorithm is stored and a second algorithm are used in a second encryption process, to yield encrypted data relating to the address of the selected first algorithm. The second algorithm is of the following general form:

$$AAD=d.f(m)+e.f(n)+REM \quad \text{—B}$$

wherein

AAD is the address of the selected first algorithm;

d, e and g are scaling constacts;

m, n and o are independent variables; and

REM is a remainder.

The encrypted data relating to the address of the first encryption algorithm and which is to be stored in the transponder 1.1, is preferably the remainder (REM) part only of the aforementioned second encryption process. The REM-data may be four bits in length.

Figure 3:
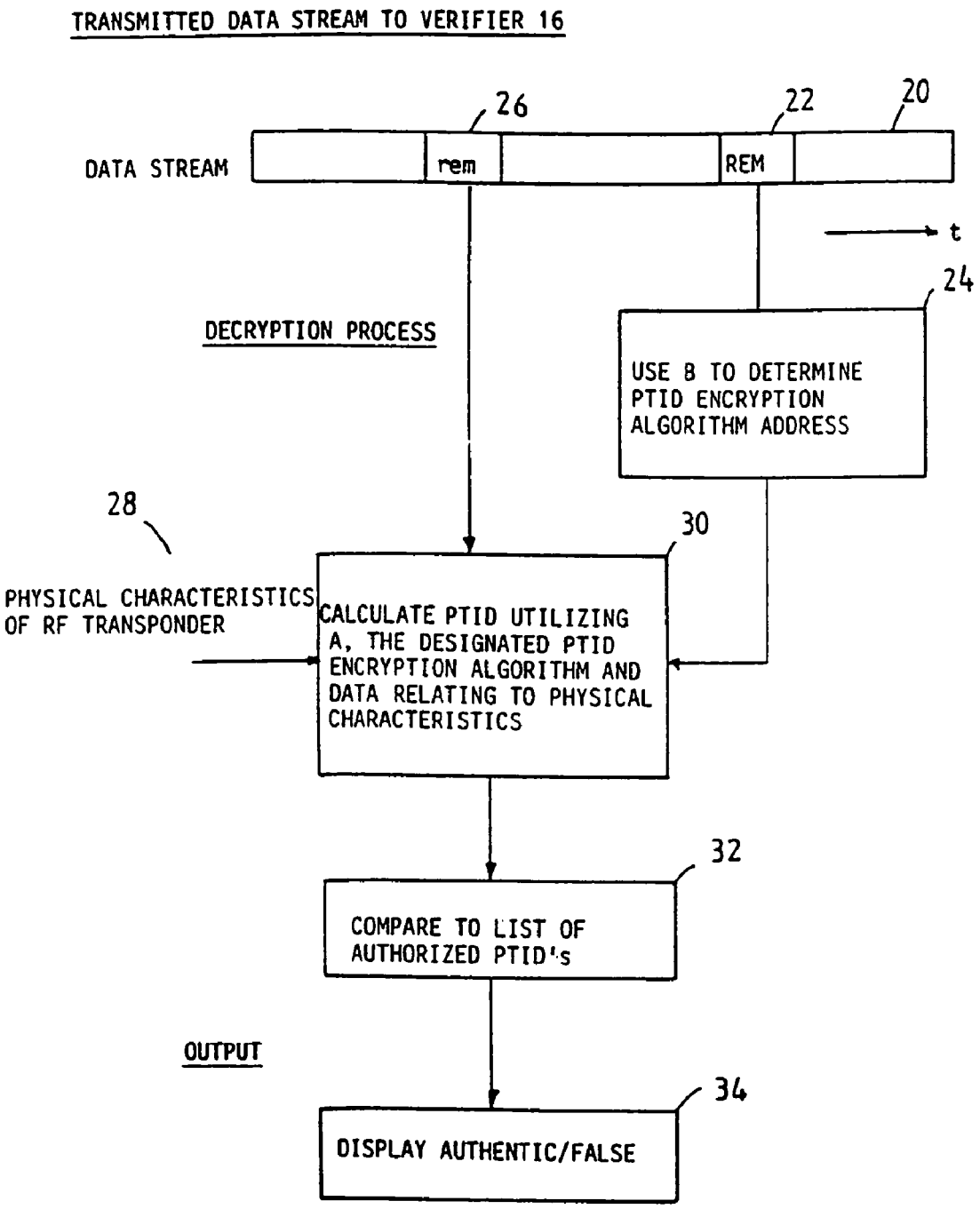
FIG. 3 is a basic flow diagram of a decoding process forming part of the method according to the invention.

The data stored in the memory arrangement 52 of transponder 1.1 and which is backscatter modulated in the form of a data stream on the energizing signal 62 during a reading or verification process of the transponder, is diagrammatically illustrated in FIG. 3.

The data stream is designated 20 in FIG. 3. The REM-data 22 is utilized together with equation 8 as shown at 24, to calculate the address of the first encryption algorithm used by the encoder 14.1 to provide encrypted data relating to the randomly selected PTI number of the encoder. This address is utilized by the computing means 56 to retrieve the first algorithm from the memory arrangement 58 forming part of the verifier.

The aforementioned first algorithm, the rem-data 26 in the data stream 20 and input data 28 relating to physical characteristics (in this sample the frequency $f_c$ of the clock 50) of the transponder are utilized by the verifier 16 to calculate a plain-text output number at 30.

The plain-text output number is fed at 32 to a comparator of the computing means 56, to compare the number to a list of authorized PTID numbers stored in the memory arrangement 58 of the verifier. If the output number corresponds to one of the authorized PTID numbers, the verifier displays on display 18 the message "AUTHENTIC". This would indicate that the transponder 1.1 has been programmed with an authorized encoder 14.1 at the source of the product. If the output number does not so correspond, it would mean that the transponder 1.1 includes fake data and has not been programmed at an authorized source of the particular product. A "FALSE" message would then be displayed on display 18.

It will be appreciated that there are many variations in detail on the method and system according to the invention without departing from the scope and spirit of the appended claims.

The invention claimed is:

1. An electronic identification system including:

at least one transponder encoder for writing data to a transponder;

said encoder comprising means for providing an identification code characteristic of an entity [externally of] *external to* the transponder;

a plurality of transponders each adapted to receive data from the at least one encoder and to store the data received in a respective memory arrangement of the transponder;

at least one verifier for interrogating a selected transponder and [to read] *reading* data stored in the memory arrangement of the selected transponder via a radio frequency link;

wherein said encoder further comprises an encryption device for utilizing an algorithm and input data characteristic of the encoder to generate encrypted data to form at least part of the data written to the *selected* transponder;

the at least one verifier [comprises] *comprising* computing means for extracting and deciphering the encrypted data from the data read thereby; *and* a comparator for comparing the deciphered data to authorized data and an indicator for providing an indication of an outcome of the comparison.

2. A system as claimed in claim 1, wherein the encoder includes a memory arrangement [wherein] *configured to store* a plurality of [identity] *identification* codes characteristic of the encoder [are stored]; and wherein the encoder comprises a controller for [randomly] selecting [one of] *a selected identification code from* said plurality of identification codes for use as the input data by the encryption device.

3. A system as claimed in claim 2 further including a central computer for generating the plurality of identification codes, for downloading the identification codes into the memory arrangement of the encoder and into a memory arrangement of the at least one verifier.

4. A system as claimed in claim 2 wherein the algorithm comprises a first encryption algorithm and wherein the encryption device utilizes the selected identification code and the first encryption algorithm to generate the encrypted data.

5. A system as claimed in claim 4 wherein the controller of the encoder is [programmed randomly to] *configured to* select the first encryption algorithm from a [first] set of encryption algorithms pre-stored in the memory arrangement of the encoder.

6. A system as claimed in claim 5 wherein each algorithm in the [first] set of encryption algorithms is associated with a respective algorithm address in the memory arrangement of the encoder.

7. A system as claimed in claim 6 wherein the encrypted data further comprises encrypted address data relating to the respective algorithm address of the [selected] *first encryption* algorithm.

8. A system as claimed in claim 7 wherein the encryption device utilizes a second encryption algorithm and [said data relating to] the respective algorithm address to generate the encrypted address data.

9. A system as claimed in claim 8 wherein the second algorithm is of a general form wherein the respective algorithm address is equal to at least one term plus a second remainder.

10. A system as claimed in claim 9 wherein the encrypted address data comprises the [aforementioned] second remainder.

11. A system as claimed in claim [4] *1* wherein [each encryption] *the* algorithm [includes] *comprises* at least one term [which] *that* is a function of at least one physical characteristic of the *selected* transponder [into] *onto* which the data is to be written.

12. A system as claimed in claim 11 wherein the *at least one* physical characteristic *of the selected transponder* is a frequency of a clock forming part of the transponder.

13. A system as claimed in claim 11 wherein each algorithm is of a general form wherein the selected identification code is equal to said at least one term plus a first remainder.

[14. A system as claimed in claim 13 wherein the encrypted comprises the aforementioned remainder.]

15. A system as claimed in claim 8 wherein the computing means of the verifier is configured to use the second encryption algorithm to decrypt the encrypted address data to yield *the respective algorithm* address [data].

16. A system as claimed in claim 15 wherein the computing means of the verifier is configured to utilize the *respective algorithm* address [data] to retrieve the [selected] first *encryption* algorithm[, to obtain input data and to use said input data and the first encryption algorithm to decrypt the encrypted data to yield decrypted data] *when deciphering the encrypted data and generating the deciphered data*.

17. A system as claimed in claim 16 wherein the comparator forms part of the verifier and is configured to compare the [decrypted] *deciphered* data to the authorized [identification codes] *data* which [are] *is* stored in the memory arrangement of the verifier.

18. A method of verifying the authenticity of a transponder, the method including the steps of:

generating encrypted data utilizing an algorithm and input data characteristic of a transponder encoder;

writing the encrypted data and data relating to an identification code of an entity [externally of] *external to* the transponder into the transponder utilizing the transponder encoder;

reading the data written into the transponder with a verifier via a radio frequency link extending between the verifier and the transponder;

extracting from the data read, the encrypted data[; decipher], *deciphering* the encrypted data *to generate deciphered data using computing means of the verifier*; *and* comparing the deciphered data to authorized data [and providing an indication based on the comparison].

19. A method as claimed in claim 18 wherein the input data comprises an identification code characteristic of the encoder.

20. A method as claimed in claim 19 wherein the *transponder* encoder has a plurality of identification codes characteristic thereof and wherein the method includes the step of [randomly] selecting one of [these] *the plurality of identification* codes as [said] *the* input data.

21. A method as claimed in claim 18 wherein the step of generating encrypted data comprises the step of utilizing a first encryption algorithm and the identification code to generate *the* encrypted data [relating to the identification code].

22. A method as claimed in claim 21 wherein the first encryption algorithm is selectable from a first set of encryption algorithms.

23. A method as claimed in claim 22 wherein the first encryption algorithm includes at least one term [which] *that* is a function of at least one physical characteristic of the transponder [into which the data is written].

24. A method as claimed in claim 23 wherein each algorithm of the first set of encryption algorithms is accessible by the encoder from a memory arrangement thereof utilizing a respective algorithm address.

25. A method as claimed in claim 24 wherein the step of generating encrypted data comprises the step of utilizing a second encryption algorithm and data relating to the respec tive algorithm address of the selected algorithm, to generate encrypted data relating to the respective algorithm address.

26. A method as claimed in claim 25 including the step of utilizing at the verifier decrypted data relating to the respective algorithm address to retrieve from a memory arrangement of the verifier the first encryption algorithm utilized during the first encryption process.

27. A method as claimed in claim 26 comprising the steps of providing to computing means in the verifier input data; and utilizing said input data and the retrieved first encryption algorithm to decrypt the encrypted data relating to the identification code.

28. A method as claimed in claim 27 wherein the step of comparing comprises the step of comparing the decrypted data relating to the identification code to data relating to authorized identification codes stored in a memory arrangement of the verifier.

*29. A method of verifying the authenticity of a transponder comprising:*

*receiving, at a computing means, encrypted data and input data relating to a physical characteristic of the transponder;*

*applying an algorithm to the encrypted data and the input data, using the computing means, to generate an output number; and*

*comparing, using the computing means, the output number to a list of numbers.*

*30. The method of claim 29, wherein the transponder comprises a clock defining a clock frequency, and wherein the input data relating to a physical characteristic of the transponder comprises the clock frequency.*

*31. The method of claim 29, wherein the list of numbers comprises a plurality of identification numbers characteristic of an entity external to the transponder.*

*32. The method of claim 29, wherein the list of numbers comprises a plurality of identification numbers characteristic of an encoder.*

*33. The method of claim 29, wherein the computing means is part of a reader.*

*34. A reader configured to authenticate a transponder, the reader comprising:*

*an RF transceiver; and*

*computing means configured to:*

*receive encrypted data and input data relating to a physical characteristic of the transponder via the RF transceiver;*

*apply an algorithm to the encrypted data and the input data to generate an output number; and*

*compare the output number to a list of numbers.*

* * * * *

UNITED STATES PATENT AND TRADEMARK OFFICE

CERTIFICATE OF CORRECTION

PATENT NO. : RE44,220 E
APPLICATION NO. : 12/479504
DATED : May 14, 2013
INVENTOR(S) : Turner et al.

It is certified that error appears in the above-identified patent and that said Letters Patent is hereby corrected as shown below:

In the Claims:

Column 8,
Line 23, "the transponder" should read --the selected transponder--;
Line 56, "encrypted data" should read --encrypted data, and--.

Signed and Sealed this
Seventeenth Day of September, 2013

Teresa Stanek Rea
*Deputy Director of theUnited States Patent and Trademark Office*